Fig. 1

July 17, 1962    E. W. ELLIOTT    3,044,381
CAMERA SHUTTER ARRANGEMENT AND MEANS FOR OPERATING THE SAME
Filed Aug. 21, 1957    5 Sheets-Sheet 1

INVENTOR.
Eugene W. Elliott,
BY
Byron, Hume, Groen + Clement
ATTYS

July 17, 1962 E. W. ELLIOTT 3,044,381
CAMERA SHUTTER ARRANGEMENT AND MEANS FOR OPERATING THE SAME
Filed Aug. 21, 1957 5 Sheets-Sheet 5

INVENTOR.
Eugene W. Elliott,
BY
Byron, Hume, Grom + Clement
Attys.

United States Patent Office 3,044,381
Patented July 17, 1962

3,044,381
CAMERA SHUTTER ARRANGEMENT AND MEANS FOR OPERATING THE SAME
Eugene W. Elliott, Oak Park, Ill., assignor, by mesne assignments, to Chicago Aerial Industries, Inc., Melrose Park, Ill., a corporation of Delaware
Filed Aug. 21, 1957, Ser. No. 679,431
12 Claims. (Cl. 95—63)

The present invention relates to aerial cameras and particularly to an improved shutter and shutter driving arrangement therefor.

Picture quality and definition in aerial photographs is dependent upon many factors, one of the more important being smooth, fast shutter action by means of which brief and accurately controlled exposure intervals are achieved, both indispensable for cameras carried in fast moving, sonic aircraft. However, it has been found that in conventional aerial cameras the inertial forces associated with the starting and the stopping of high speed shutters produce shock vibrations in the camera which, during the exposure interval, cause slight displacements in the camera, seriously interfering with the quality of and the definition in the aerial photograph.

It is an object of the present invention to provide an improved between-the-lens shutter and driving arrangement therefor characterized by fast action, accurate exposure control, and substantially shock free operation.

A more specific object of the invention is to provide a shutter arrangement operative during each cycle in a unidirectional path from a closed position through an open position and into a closed position.

An additional object of the invention is to provide a shutter arrangement including double lobe shutter blades movable during each film exposure cycle from a position in which one lobe of each shutter blade obstructs the camera aperture and into a position in which the other lobe of each shutter blade obstructs the aperture, the aperture being unobstructed during a portion of the cycle.

A further object of the invention is to provide a balanced and smooth operating shutter mount whereby the shutter blades may be of a light construction and non-rigidly supported on the mount thereby diminishing the inertial and frictional forces associated with shutter blade movement.

Another object of the invention is to provide a drive mechanism for the shutter arrangement which not only actuates movement of the shutter blades but also at the end of shutter blade travel absorbs the inertial forces in the moving shutter blades and decelerates the shutter blades to a stop.

An additional object of the invention is to provide a reversible drive mechanism for the shutter arrangement which during each cycle of operation sequentially actuates and brakes the movement of the shutter blades and transfers the energies associated with the braking operation to storage for use in the next cycle of operation.

The features of the invention pertain to the specific structures and arrangements whereby the above outlined and additional objects of the invention are attained.

The invention, both as to its construction and mode of operation, will be better understood by reference to the following specification and drawings, forming a part thereof, wherein.

Figure 1:
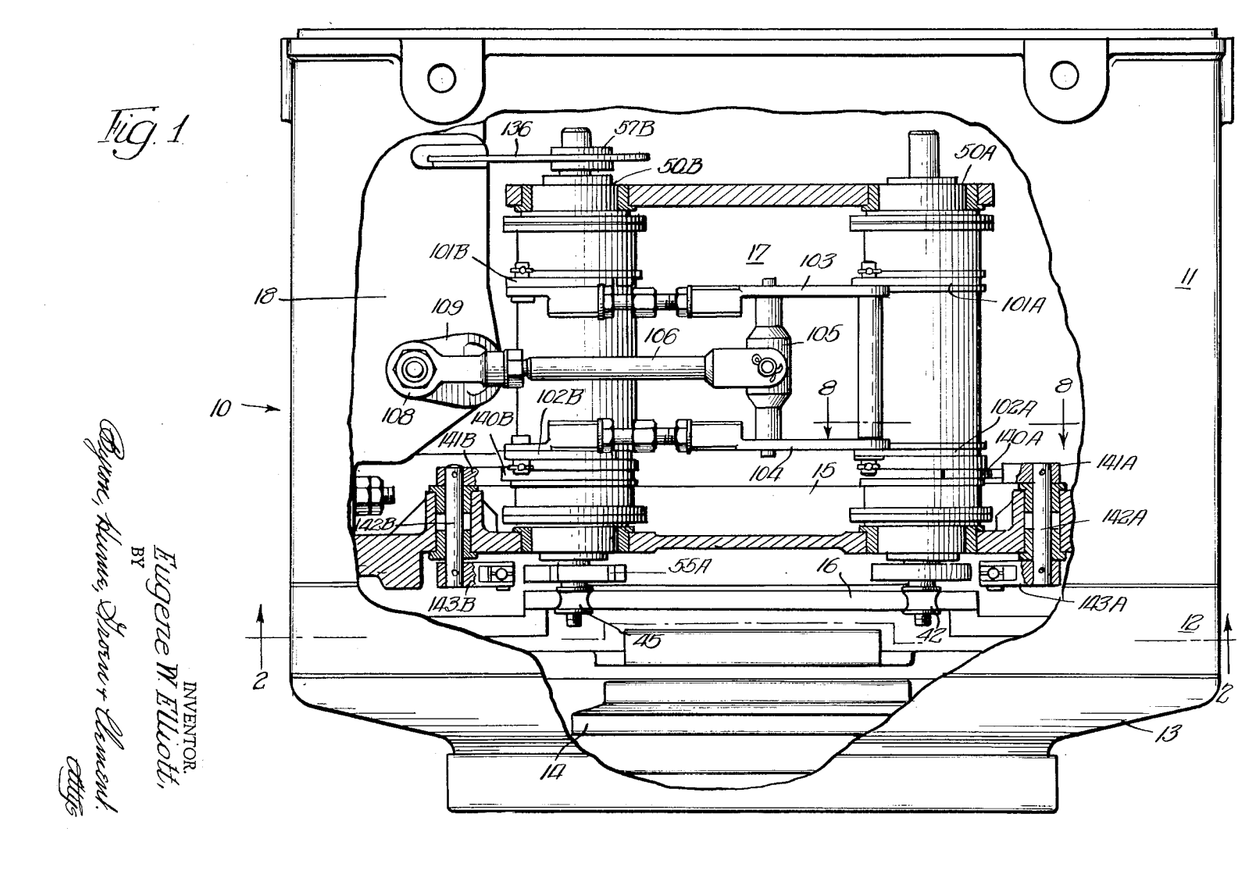
FIGURE 1 shows a lens cone housing for an aerial camera partially broken away and sectionalized to show the improved shutter and shutter driving arrangement in accordance with the invention.
Figure 2:
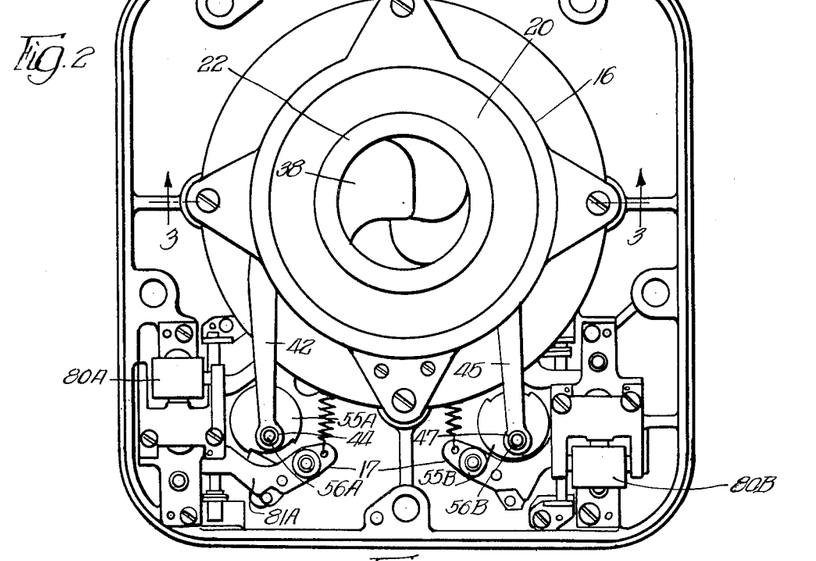
FIG. 2 is a sectional view taken along lines 2—2 of FIGURE 1 showing the shutter assembly and the driving arrangement therefor.

Referring now to the drawings, there is shown in FIGURE 1 a lens cone housing 10 from which the film magazine has been removed. The lens cone housing includes a main housing 11, a shutter housing 12 and a lens guard 13 which are partially broken away to show the internal structure of the camera. Specifically, within the lens cone housing there is located a lower lens unit 14, and upper lens 15, a shutter assembly 16, a shutter drive assembly 17 and a motor-clutch unit 18. FIGURE 2 is a plan view looking upwards into the lens cone housing with the lens guard 13 removed, showing in particular the shutter assembly 16 and the shutter drive assembly 17.

Figure 3:
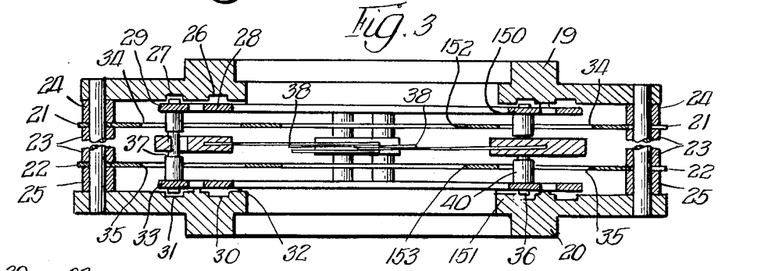
FIG. 3 is a cross-sectional view taken along lines 3—3 in FIG. 2 of the shutter mounting assembly.
Figure 4:
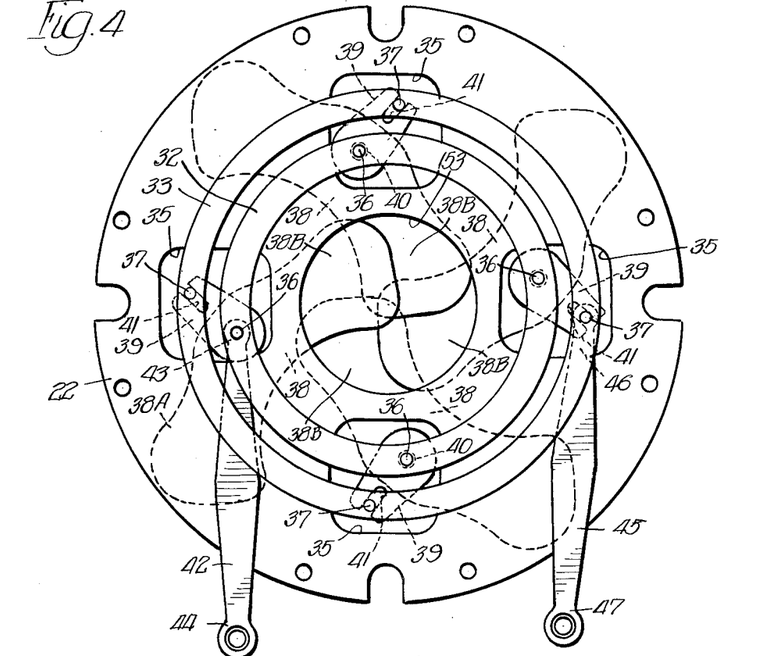
FIG. 4 is a plan view of the shutter mount assembly with the bottom shutter frame removed.

The shutter assembly 16, as best shown in FIGURE 2 and in the enlarged views of FIGURES 3 and 4, comprises an upper shutter frame 19 adjacent to which the upper lens unit 15 is mounted, a lower shutter frame 20 adjacent to which the lower lens unit 14 is mounted, a guide plate 21 and a guide plate 22 spaced apart from one another by means of cylindrical spacers 23 and spaced respectively from the upper shutter frame 19 by means of cylindrical spacers 24 and from the lower shutter frame 20 by means of cylindrical spacers 25. The shutter frame 19 includes an aperture 150 coaxial with an aperture 151 in the shutter frame 20 and with smaller apertures 152 and 153, respectively, in the guide plate 21 and the guide plate 22. These apertures form in composite an aperture through which the image is transmitted to the photographic film. Additionally, the plates 21 and 22 are provided with substantially square apertures designated respectively, 34 and 35, arranged in alignment and in quadrature about the central apertures therein.

The inner surface of the upper shutter frame 19 includes therein an inner circular channel 26 and a concentrically located outer circular channel 27 for receiving, respectively, an inner slide ring 28 and an outer slide ring 29. Similarly, the inner surface of the lower shutter frame 20 has formed therein an inner circular channel 30 and an outer circular channel 31 for receiving, respectively, an inner slide ring 32 and an outer slide ring 33. The upper and lower inner rings 28 and 32 are in vertical alignment and are joined together at quadrature by pins 36 extending through the apertures 34 and 35 of the guide plates 21 and 22. Similarly, the upper and lower outer rings 29 and 33 are vertically aligned and are joined together at quadrature by peripherally grooved pins 37 extending through the apertures 34 and 35 in the guide plates 21 and 22.

Figures 7, 8, 9:
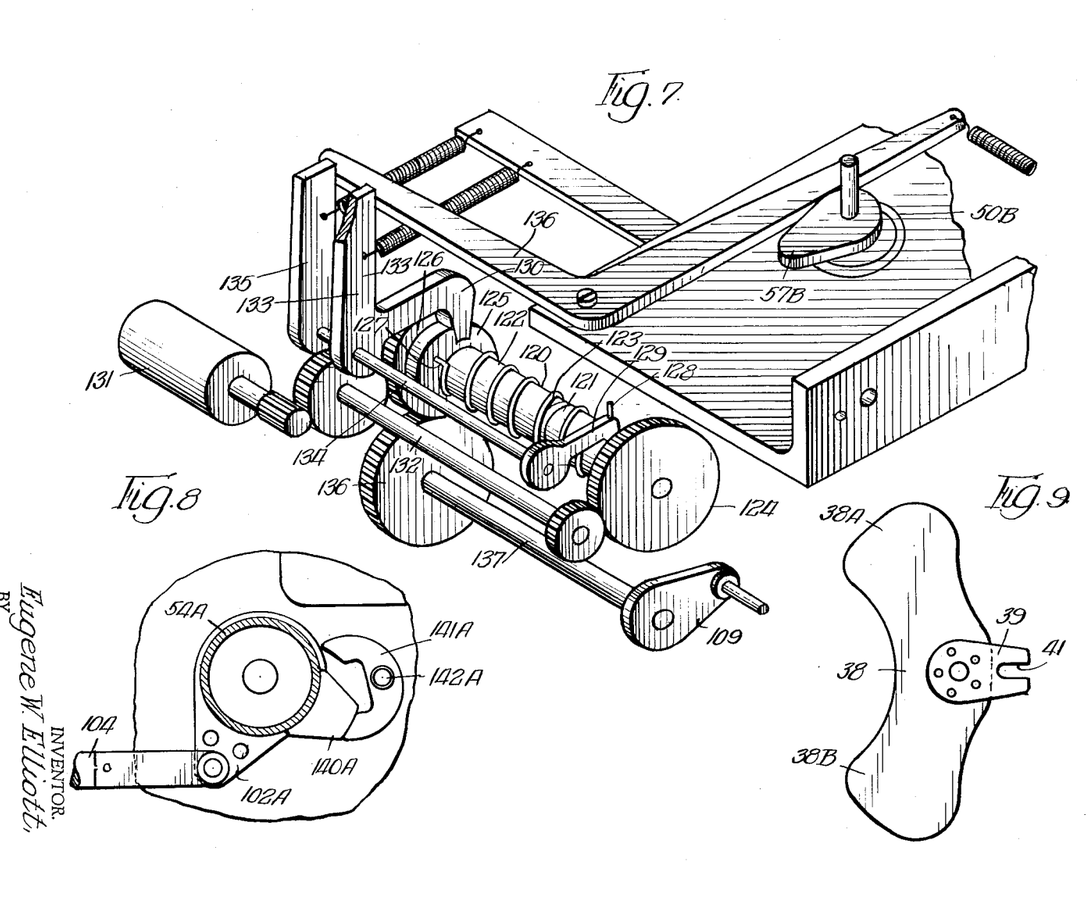
FIG. 7 is a perspective view in schematic form of a motor-clutch unit for cocking the spring drive assemblies.
FIG. 8 is a cross-sectional view of one of the spring drive assemblies taken along lines 8—8 of FIG. 1.
FIG. 9 is a plan view of one of the shutter blades and hub therefor employed in the shutter arrangement.

Positioned in the spacing between the guide plates 21 and 22 are a plurality of shutter blades 38, here shown to be four in number, each mounted to and secured in a hub 39 as shown in FIG. 9. Each shutter blade is of double lobe construction including a thin lobe 38A and a thin lobe 38B. Each hub 39 is loosely pivotally mounted on the associated vertical pin 36 and supported between the upper and lower inner rings 28 and 32 by means of a bearing 40 which extends through the hub and shutter blade. Additionally, each hub 39 includes a slot 41 in the end thereof remote from the shutter blade which slidably engages the associated vertical pin 37 in the peripheral groove thereof. A drive arm 42 is connected at one end 43 to the upper and lower inner rings 28 and 32 at one of the vertical pins 36, the other end 44 of the drive arm extending beyond the shutter assembly. Another drive arm 45 is connected at its one end 46 to the upper and lower outer rings 29 and 33, at one of the vertical pins 37, the other end 47 of the drive arm extending beyond the shutter assembly. The drive arms 42 and 45 are connected at their ends 44 and 47, respectively, to members in the shutter drive assembly 17 for reciprocating movement in a manner as is explained hereinafter. The reciprocating movement of the drive arms causes rotation of the slide rings thereby rotating and translating the tubs 39 and the associated shutter blades about the pins 36 and 37.

Figure 3A:
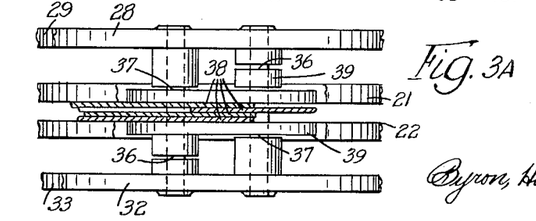
FIG. 3A is an enlarged detail showing of the cross-section of the central portion of the cross-section taken along the lines 3—3 in FIG. 2.

It is to be understood that the sectional view of FIGURE 3 is artificially extended in the vertical direction in order to permit a clearer showing of the structural elements in the shutter assembly and that in actual practice, and as shown in FIGURE 3A, the guide plates are closely spaced apart to provide support and guide surfaces for the thin lobes of the shutter blades. Because of the parallel closely spaced guide plates it is possible to use thin, light weight shutter blades thereby decreasing the inertia of the shutter arrangement and it is possible to employ a non-rigid, lower coefficient of friction mounting arrangement for shutter blades. Accordingly, the shutter assembly is one well adapted for fast operation with the expenditure of a minimum in actuating energies and will not be greatly affected by wear in the parts.

Considering now the shutter drive assembly 17, as shown in FIGURE 1, there is included a spring drive 50A associated with the drive arm 42 and a spring drive 50B associated with the drive arm 45. The detailed structure of the spring drives 50A and 50B is shown in the exploded view of FIGURE 5 and includes a crank shaft 52, a spring and spring clutch arrangement 53 and a barrel 54 enclosing the crank shaft 52 and the spring and spring clutch arrangement 53. The barrel 54 carries on one end thereof a barrel cap 66 and carries on the other end a barrel cap 67 which are rigidly secured to the barrel and through which the ends of the crank shaft 52 project for rotatable movement. The barrel cap 66 is formed with a cam finger 68 extending inwardly into the barrel chamber and the barrel cap 67 is formed with a cam finger 69 extending inwardly into the barrel chamber. The crank shaft 52 carries on one end thereof adjacent the cap 66 a crank collar 55 and a crank pin 56 and carries on the other end adjacent the cap 67 a cam 57. Additionally, there is connected to the crank shaft 52 in the barrel chamber and adjacent to the cap 66 a follower 58 having thereon a longitudinally extending cam finger 59 and adjacent to the cap 67 a follower 60 carrying thereon a longitudinally extending cam finger 61. Further, there is slidably mounted on the crank shaft 52 between the follower 58 and the follower 60 a spring carrier 62, a helical spring 63 carried on a spacer 64 and a spring carrier 65.

Figure 5:
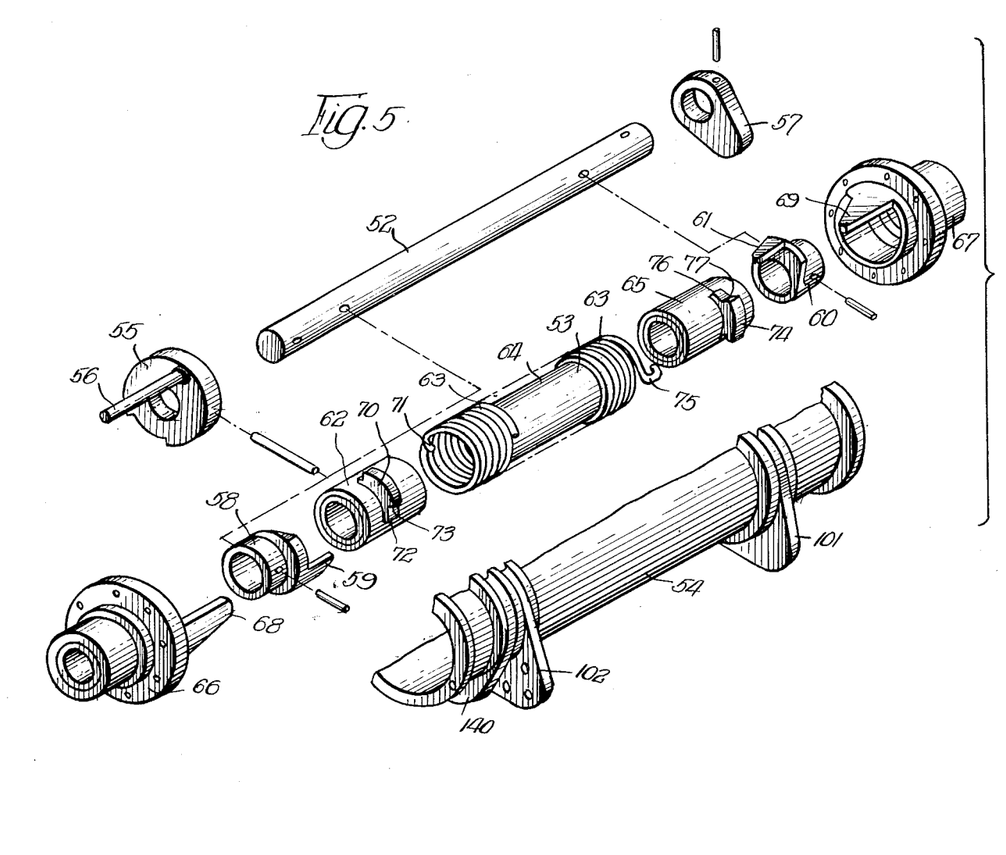
FIG. 5 is an exploded view of the shutter drive arrangement in accordance with the invention.

The carrier 62 of the spring and spring clutch arrangement 53 has formed thereon a projection 70 for engaging the end 71 of the helical spring 63. The projection 70 includes cam surfaces 72 and 73 for engaging, respectively, the cam finger 59 associated with the cam shaft 52 and the cam finger 68 associated with the barrel 54. The carrier 65 also has formed thereon a projection 74 for engaging the other end 75 of the helical spring 63. The projection 74 includes cam surfaces 76 and 77 for engaging, respectively, the cam finger 61 associated with the crank shaft 52 and the cam finger 69 associated with the barrel 54.

Considering the operation of the spring drive and assuming that the crank shaft 52 is held stationary, when the barrel 54 is rotated in the clockwise direction, for example, the cam finger 69 on the barrel cap 67 engages the cam surface 77 causing clockwise rotation of the carrier 65 and clockwise torsional compression of the helical spring 63. The spring 63 operates against the carrier 62 so that the cam finger 59 is engaged by the cam surface 72 of the carrier 62 and causes clockwise torsional forces to be applied to the crank shaft 52. Thereafter, when the barrel 54 is locked against movement and the crank shaft 52 is released for movement, the latter will be rotated in the clockwise direction by the stored torsional forces and due to its own intertia will continue rotation after the stored torsional forces are spent. As the crank shaft continues its rotation, the cam finger 61 of the follower 60 engages the cam face 76 on the carrier 65 and winds the spring 63 in torsional compression against the cam finger 68 of the barrel cap 66. At this time the follower 58 and the cam finger 59 have been rotated from engagement with carrier 62. Accordingly, as the spring 63 is wound by the cam finger 61 against the cam finger 68, the crank shaft 52 is gradually decelerated and stopped.

Assuming a latch mechanism for the crank shaft 52, further motion of the crank shaft can be arrested and the spring 63 held in torsional compression. Thereafter, should the barrel 54 be rotated in the reverse, or counter-clockwise, direction, the cam finger 68 on the barrel cap 66 will further wind the spring 63 in torsional compression against the cam finger 61 of the follower 60 connected to the crank shaft 52. Accordingly, torsional forces will be applied to the crank shaft 52 for causing rotation in the counter-clockwise direction when the crank shaft is again released for movement.

From the foregoing description it is clear that the spring drive operates not only as an actuating mechanism for the crank shaft 52 but also operates as a highly efficient energy recovery-braking device. The braking action reduces stresses in the members of the spring drive and due to the reversing rotational motion of both the crank shaft 52 and the barrel 54, overwind can never be experienced in the helical spring 63.

For purposes of further describing the operation of the spring drives 50A and 50B in the camera arrangement, the reference numerals used in identifying the elements of the spring drive in FIG. 5 have been employed in the display of FIG. 1, the suffix A being added to the reference numerals of the elements associated with the spring drive 50A and the suffix B being added to the reference numerals of the elements associated with the spring drive 50B. As shown in FIGS 1 and 2 the crank pin 56A of the spring drive 50A is engaged in an aperture at the end 44 of the drive arm 42 in the shutter assembly, and the crank pin 56B is inserted in the aperture at the end 47 of the drive arm 45 in the shutter assembly. The spring drives are designed so that during each half cycle the shafts thereof rotate approximately 170° between the release position and the latch position. Specifically, in the arrangement shown in FIG. 2 the crank collar 55A and its associated crank pin 56A, upon release, travel 170° in the counter-clockwise direction before latching and the crank collar 55B and its associated crank pin 56B travel 170° in the counter-clockwise direction. On the next cycle of operation the crank collars 55A and 55B travel 170° in the clockwise direction. Accordingly, the drive arms 42 and 45 experience reciprocating motion causing reversing rotation of the slide rings in the shutter assembly 16.

Figure 6:
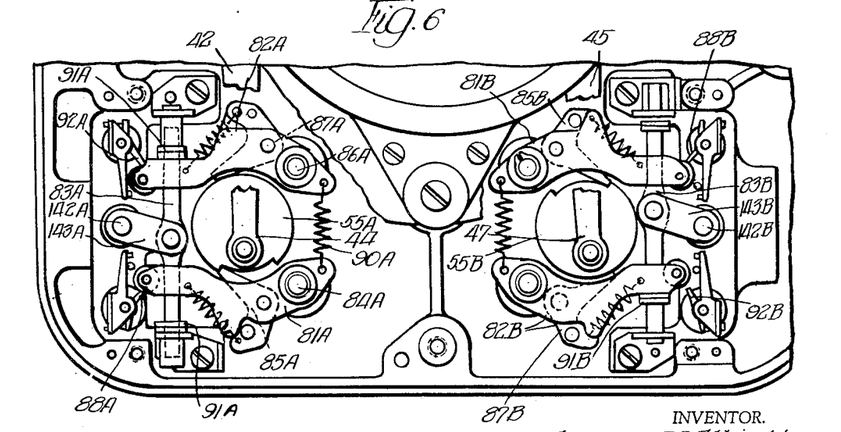
FIG. 6 is an enlarged view of a portion of FIG. 2 showing the details of the spring drive locking mechanism.

Considering now the locking and release arrangement for the spring drives 50A and 50B and referring specifically to FIGS. 2 and 6, there is shown associated with the spring drive 50A a trip magnet 80A, a latch lever 81A, an oppositely disposed latch lever 82A and a lever stop bar 83A. The trip magnet 80A is a conventional electro-magnetic device including a coil and an armature wherein the armature is operated responsive to energization of the coil. Because electro-magnetic devices of this type are quite old and well understood in the art, further description of the trip magnets is not given herein. The latch lever 81A is of parallel plate construction, is rotatable about an axis 84A and carries pivotally mounted thereon between the parallel plates a dog 85A for engaging a peripheral slot in the crank collar 55A. The latch lever 82A is of construction identical to that of the lever 81A being rotatable about an axis 86A and carries pivotally mounted thereon a dog 87A which is adapted also to engage the peripheral slot in the crank collar 55A.

In the arrangement shown, the dog 85A on the latch lever 81A locks the crank collar 55A against counter-clockwise rotation. A spring biased finger 88A operates against a ball bearing on the latch lever 81A to prevent rotation of the latch lever 81A thereby preventing release of the crank collar 55A. Associated with the finger 88A are suitable means operable upon energization of magnet 80A to remove the finger 88A from its position holding latch lever 81A. Thereupon the latch lever 81A, and the dog 85A thereon are rotated by the forces both in the spring 90A and the spring drive 50A and the crank collar 55A is rotated. Accordingly, the crank collar 55A rotates until the energy in the spring drive 50A is spent and the peripheral slot in the collar 55A is engaged by the dog 87A of the latch lever 82A. At this time, the crank collar 55A is prevented from further rotation and the latch lever 82A is prevented from releasing movement by the stop 91A on the stop bar 83A.

The locking mechanism associated with the spring drive 50B is similarly disposed with the dog 85B locking the crank collar 55B against rotation. At the same time or shortly after the trip magnet 80A operates, the armature of the trip magnet 80B is energized so to move the finger 88B from its position holding latch lever 81B in the same manner as explained above with regards to the finger 88A and lever 81A, so that the latch lever 81B and its dog 85B are moved to release the crank collar 55B. The crank collar 55B rotates and is finally engaged by the dog 87B of the latch lever 82B to prevent further rotation. Reset operations, explained hereinafter in detail, then take place whereby the stop bars 83A and 83B are moved to disengage the stops 91A and 91B from the latch levers 82A and 82B and to cause the latch levers 82A and 82B to be reset against the pivotal fingers 92A and 92B. Rewind takes place in the spring drives 50A and 50B so that the drives are cocked and prepared for a reverse cycle of operation.

At a selected time thereafter the spring biased finger 92A is operated by the trip magnet 80A to release the latch lever 82A and its dog 87A from engagement with the crank collar 55A of the spring drive 50A. The crank collar 55A is then rotated in the clockwise direction 170° and engaged by the dog 85A. In the same pattern as described above, the trip magnet 80B is also operated to displace the spring biased finger 92B causing release of the latch lever 82B and its dog 87B from the crank collar 55B. The crank collar 55B rotates in the clockwise direction 170° and is engaged and latched by the dog 85B. The locking mechanisms will then be reset and the spring drives rewound to prepare for another cycle of operation.

The locking and release arrangement associated with the spring drive 50B is identical to that described with regards to the spring drive 50A, the only change being that the lock mechanisms are shown in reversed orientation. The identity between the locking mechanism for the spring drive 50A and for the spring drive 50B is indicated by the identity of reference numerals, the suffix B being added to the reference numerals associated with the elements of the locking mechanism of the spring drive 50B whereas the suffix A is associated with the elements of the locking mechanism associated with the spring drive 50A.

Considering now the means for reversibly rotating the barrels 54A and 54B of the spring drives 50A and 50B, as shown in FIG. 1 the barrel 54A includes thereon spaced apart levers 101A and 102A and the barrel 54B includes thereon spaced apart levers 101B and 102B. A yoke fitting 103 is pivotally connected at its ends between the levers 101A and 101B and a yoke fitting 104 is pivotally connected at its end between the levers 102A and 102B. At an intermediate point, the yoke fittings 103 and 104 are pivotally connected to a yoke bar 105 which is joined at its mid-section to a connecting rod 106 extending to the motor-clutch unit 18. At the motor-clutch unit 18 the connecting rod 106 is connected at its end 108 to the eccentric of a crank 109. The crank 109 is driven by the motor-clutch unit 18, in a manner as explained in detail hereinafter, through consecutive half revolutions so that the connecting rod 106, the yoke bar and the yoke fittings connected thereto experience a reciprocating motion thereby causing the barrels 54A and 54B to be reversibly rotated.

As explained above, the crank collars 55A and 55B of the spring drives are reversibly rotated through 170° between release point and locking point, part of the travel being due to energy stored in the spring and another lesser part of the travel being due to the inertia of the moving crank shaft and associated shutter drive members. The inertia of the moving crank shaft is used to wind the spring in the spring drive to store energy for reverse rotation of the crank shaft. Accordingly, it is not necessary that the barrels 54A and 54B be rotated through a full 170° to cause 170° rotation of the crank shaft. It has been found sufficient to rotate the barrels through an angle substantially smaller than 170° and in one instance in practice through an angle of less than 120°. This permits the use of a short stroke lever and cam assembly having an abbreviated recycle period for cocking the spring drives, thereby obviating the need for a more complex, slower speed cocking mechanism.

Considering now the structure of the motor-clutch unit 18, as shown in FIG. 7 there is included a spring clutch 120 having coaxial shaft sections 121 and 122 linked by a helical clutch spring 123. The shaft section 121 is connected at its free end to an input drive gear 124 and the shaft section 122 has connected to its free end a notched collar 125 and an output drive gear 126. The clutch spring 123 is connected at one end 127 to the collar 125 and at its other end 128 normally engages a spring stop lever 129. A latch 130 is normally engaged in the notch of the collar 125 thereby holding the collar, the output drive gear 126 and the shaft section 122 against rotation. The latch 130, the collar 125, the spring 123 and the spring stop lever 129 are arranged so that under normal conditions the helical spring 123 does not engage or grip the shaft sections 121 and 122.

A continuously rotating drive motor 131 is connected to the input drive gear 124 by means of intermediate gearing 132 so that the input drive gear 124 and the shaft section 121 are in continuous rotation in the counter-clockwise direction as shown in FIGURE 7. The latch 130 is a part of a lever 133 which is pivotally mounted on a shaft 134. The spring stop lever 129 is rigidly connected to one end of the shaft 134 which carries on its other end a rigidly connected lever 135. A knock lever 136 is mounted in close proximity to the levers 133 and 135 and is responsive to the rotation of the cam 57B in the spring drive 50B for operating the levers 133 and 135, respectively, to disengage the latch 130 from the collar 125 and to disengage the spring stop lever 129 from the end 128 of the helical spring 123. In this condition the helical spring 123 grips both the shaft sections 121 and 122 transferring the rotational movement of the shaft section 121 to the shaft section 122 thereby causing the output drive gear 126 to rotate in the counter-clockwise direction. During the course of this rotation the cam 57B permits restoration of the knock lever 136 to its original position so that the latch 130 is prepared to engage the notch in the coller 125 and the spring stop lever is prepared to engage the end 128 of the helical spring 123. Accordingly, the clutch 120 makes one revolution whereupon the spring stop lever 129 engages the end 128 of the spring 123 thereby disengaging the spring 123 from the shaft sections 121 and 122, and thereafter the latch 130 falls into the notch in the collar 125 to halt rotation of the output drive gear 126. During the course of this one revolution the output drive gear 126 of the spring clutch 120 drives a meshing gear 136 through one half of a revolution. A shaft 137 is connected at one end to the meshing gear 136 and is terminated at its other end in the crank 109. The crank 109, as previously explained, is connected to the connecting rod 106 and the yoke arrangement for driving the spring drives 50A and 50B.

The rotation of the barrels 54A and 54B in the spring drives 50A and 50B perform one more control function with regards to the locking mechanism thereof. Specifically, as shown in the cross-sectional view of FIG. 8 taken along lines 8—8 of FIG. 1, the barrel 54A has thereon in addition to the flange 102A a locking cam 140A which is rotatable against the follower 141A connected to a shaft 142A. The shaft 142A is terminated in a lever 143A, as best shown in FIG. 6, which is connected to the lever stop bar 83A of the locking mechanism. Accordingly, each time the barrel 54A is rotated, the locking cam 140A causes rotation of the shaft 142A extending to the locking mechanism for the spring drive 50A, whereby the lever stop bar 83A is moved to stop one of the latch levers 81A and 82A from movement and to prepare the other of the latch levers for movement responsive to the operation of the trip magnet 80A. The same structure and operation is provided for the spring drive 50B.

Considering now the operation of the improved shutter and shutter drive arrangement in accordance with the invention, and assuming that the spring drives 50A and 50B are cocked and locked against rotation in the manner as shown in FIG. 6, the lobes 38B of the shutter blades 38 will be in obstructing relationship with regards to the camera aperture as shown in FIG. 4. Assuming further that it is desired to open the shutter and expose the film for 1/50 of a second, for example, the trip magnets 80A and 80B are controlled by electrical circuits, not shown, to operate consecutively so that the trip magnet 80A is operated first and at approximately a fiftieth of a second later the trip magnet 80B is operated. Responsive to the operation of the trip magnet 80A the latch lever 81A and its associated dog 85A are released from engagement with the crank collar 55A so that the crank collar is permitted to rotate counter-clockwise 170° into a locking position with the latch lever 82A and its associated dog 87A. In actual practice an overtravel of about 10° is permitted in the rotation of the crank collar 55A, this being done to permit greater rotational speed, to allow for more gradual deceleration and to insure latching action of the dog into the slot of the crank collar. Upon rotation of the crank collar 55A and the associated crank pin 56A, the drive arm 42 of the shutter assembly 16 is driven so as to cause clockwise rotation of the upper and lower inner rings 28 and 32. This action causes rotation through an acuate angle and translation of the shutter blades 38 and the associated hub 39 in a counter-clockwise direction about the vertical pins 37, whereby the lobes 38B of the shutter blades 38 are moved from an obstructing position with regards to the aperture of the camera. Due to the actuating and braking operation in the spring drive, movement of the shutter blades 38 is rapid from the obstructing to the non-obstructing position, and the shutter blades, the hubs and the inner rings are decelerated by the braking and energy storing operation taking place in the spring drive 50A. Accordingly, there is a minimum of shock associated with this stopping action of the shutter blades.

At approximately a fiftieth of a second later the trip magnet 80B is operated so as to cause the latch lever 81B and its associated dog 85B to disengage the crank collar 55B and cause rotation thereof through 170° into its latching position. Accordingly, the drive arm 45 is driven so as to cause counter-clockwise rotation of the upper and lower outer slide rings 29 and 33. This action causes rotation of the shutter blades 38 and the associated hubs 39 about the vertical pins 36 so that the shutter blades are driven from an unobstructed position with regards to the aperture into an obstructing position with the lobes 38A now closing the aperture. Again, movement of the shutter blades 38 is rapid and the blades are decelerated into their obstructing position due to the energy storage operation of the spring drive 50B.

At the time of rotation of the crank collar 55B and movement of the drive arm 45, the cam 57B associated with the spring drive 50B is rotated so as to actuate the motor-clutch unit 18 by driving the knock lever 136 thereof against the lever arms 133 and 135. Accordingly, the spring clutch 120 is operated so as to cause a half revolution of the crank 109. Rotation of the crank 109 causes movement of the connecting rod 106 and the yoke associated with the barrels 54A and 54B of the spring drives 50A and 50B so that the barrels are rotated through approximately 120° to cock the spring drives 50A and 50B for reverse operation.

Further, rotation of the barrels 54A and 54B with their locking cams 140A and 140B drive the followers 141A and 141B so that the stop bars 83A and 83B in the locking mechanisms are moved so as to stop the latch levers 81A and 81B from movement and to prepare the latch levers 82A and 82B for release movement. At this time then one cycle of shutter operation is completed and the shutter and shutter drive arrangement are prepared to operate in response to operation of the trip magnets 80A and 80B. The next operation of the shutter and shutter drive arrangement will be exactly that as described above except that the operation will be reversed in direction. Specifically, the crank collars 55A and 55B rotate in the clockwise direction so that the upper and lower inner slide rings 28 and 32 are rotated in a counter-clockwise direction and the upper and lower outer slide rings 29 and 33 are rotated in a clockwise direction. Accordingly, the shutter blades 38 and the hubs 39 are rotated and translated so as to move the lobes 38A from the obstructing position with regards to the aperture, to maintain the aperture nonobstructed for the selected time interval and finally to move the lobes 38B into obstructing relationship with regards to the aperture.

Though the operation of the shutter and shutter arrangement has been described in terms of an exposure period described as a fiftieth of a second, it is understood that this is merely exemplary and that the arrangement may be operated so that the exposure period is much longer or much shorter. For example, in night photographic operations utilizing pyrotechnic flares or bombs it is necessary to maintain the camera shutter opened for the drop period of the pyrotechnics which may be several minutes. In another example, for low level and high speed daylight photographic operations, it is necessary to limit the exposure interval to much shorter periods in the order of a hundredth of a second. Through use of a double drive shutter of the type described it is easy to facilitate the control for achieving this required flexibility in operation.

It is to be noted that parallel plate construction is used extensively in the shutter arrangement and drive therefor, in the slide rings, the guide plates and the latch levers, to mention a few instances. Through use of such construction it is possible to provide double end support for pivots and pins and to provide suitable guides for the moving parts, whereby a substantial reduction in the stresses and in the wear of parts is achieved. Accordingly, the operational dependability and the useful life of the mechanisms are greatly increased.

From the foregoing disclosure and description, it is apparent that there has been presented herewith an improved shutter and shutter arrangement that is fast acting, provides accurate exposure control and is substantially shock free in operation. Though the embodiment of the invention described herein is at present believed to be preferred, it is understood that variations and modifications may be made therein and it is intended to cover in the appended claims all such modifications as fall within the true spirit and scope of the invention.

What is claimed is:

1. A shutter arrangement for use in a non-vertical position comprising a housing having a central aperture formed therein, a parallel pair of closely spaced apart apertured guide plates positioned coaxially to said central aperture, a plurality of thin shutter blades spaced apart about the perimeter of said central aperture and disposed in the spacing between said parallel guide plates, means loosely supporting each of said shutter blades in said housing for movement in its own plane and for free movement between said guide plates and transverse to its own plane, said supporting means permitting at least partial support of each of said blades by the lowermost of said guide plates and by others of said shutter blades, and means for unidirectionally rotating and reversibly translating said shutter blades from a first position obstructing said aperture to a second position obstructing said aperture through a non-obstructing position, whereby said shutter is opened and closed.

2. A shutter arrangement for use in a non-vertical position comprising a housing having a central aperture formed therein, a parallel pair of closely spaced apart apertured guide plates positioned coaxially to said central aperture, a plurality of thin shutter blades spaced apart about the perimeter of said central aperture and disposed in the spacing between said parallel guide plates, each of said shutter blades having a first shutter lobe and a second shutter lobe, means loosely supporting each of said shutter blades in said housing for rotational and translational movement in its own plane and for free movement between said guide plates and transverse to its own plane, said supporting means permitting at least partial support of each of said blades by the lowermost of said guide plates and by others of said shutter blades, and means for unidirectionally rotating and reversibly translating said shutter blade from a first position with said first lobe obstructing said aperture to a second position with said second lobe obstructing said aperture through a non-obstructing position, whereby said shutter is opened and closed.

3. A shutter arrangement for use in a non-vertical position comprising a housing having a central aperture formed therein, a first slide ring, a second slide ring, said slide rings being mounted in said housing concentric to one another and to said central aperture and for rotation about said center, a parallel pair of closely spaced apart apertured guide plates positioned coaxially to said central aperture, a plurality of thin shutter blades spaced apart about the perimeter of said central aperture and disposed in the spacing between said parallel guide plates, each of said shutter blades having a first shutter lobe and a second shutter lobe and being loosely pivotally linked to said first slide ring and loosely slidably linked to said second slide ring for planar movement with said slide rings between a first position with said first lobe obstructing said aperture and a second position with said second lobe obstructing said aperture through a non-obstructing position and for free transverse movement between said guide plates, said linking arrangement between said blades and said slide rings permitting at least partial support of each of said blades by the lowermost of said guide plates and by others of said shutter blades, and means for individually rotating said first slide ring and said second slide ring to move said blades between said first obstructing position and said second obstructing position, whereby said shutter is moved in a cycle from a closed position through an open position and into a closed position.

4. A shutter arrangement for use in a non-vertical position comprising a housing having an aperture formed therein, a first slide ring, a second slide ring, said slide rings being mounted in said housing concentric to one another and to said aperture and for rotation about said center, a parallel pair of closely spaced apart apertured guide plates positioned coaxially to said aperture, a plurality of thin shutter blades equally spaced apart about the perimeter of said aperture and disposed in the spacing between said parallel guide plates, each of said shutter blades having a first shutter lobe and an angularly spaced second shutter lobe and being loosely linked at the juncture between said shutter lobes pivotally to said first slide ring and slidably to said second slide ring for movement therewith between a first position obstructing said aperture and a second position obstructing said aperture through a non-obstructing position and for free transverse movement between said guide plates, said linking arrangement between said blades and said rings permitting at least partial support of each of said blades by the lowermost of said guide plates and by others of said shutter blades, each of said blades being disposed in said first position with said first shutter lobe obstructing said aperture and being disposed in said second position with said second shutter lobe obstructing said aperture, and means for individually rotating said first slide ring and said second slide ring in opposite directions to rotate and to translate said shutter blades from said first obstructing position into said non-obstructing position and to rotate said shutter blades from said non-obstructing position into said second obstructing position, whereby said shutter is moved in a cycle from a closed position through an open position and into a closed position.

5. A shutter arrangement for use in a non-vertical position comprising a housing having an aperture formed therein, a pair of first coaxial slide rings longitudinally spaced apart from one another, a pair of second coaxial slide rings longitudinally spaced apart from one another, each first slide ring being coplanar with a second slide ring and said slide rings being mounted in said housing coaxially with the center of said aperture and for rotation about said axis, a parallel pair of closely spaced apart apertured guide plates positioned coaxially with said aperture and in longitudinal spacing between said pairs of first and second slide rings, a plurality of thin shutter blades equally spaced apart about the perimeter of said aperture and disposed in the spacing between said parallel guide plates, each of said shutter blades having a first shutter lobe and a second shutter lobe and being loosely linked at the juncture between said lobes pivotally to one of said pairs of first and second slide rings and slidably to the other one of said pairs of first and second slide rings for movement therewith between a first position obstructing said aperture and a second position obstructing said aperture and through a non-obstructing position and for free transverse movement between said guide plates, said linking arrangement between said blades and said rings permitting at least partial support of each of said blades by the lowermost of said guide plates and by others of said shutter blades, each of said shutter blades being disposed in said first position with said first shutter lobe obstructing said aperture and being disposed in said second obstructing position with said second shutter lobe obstructing said aperture, first drive means for reversibly rotating said pair of first slide rings through an acute angle to move said shutter blades between one of said obstructing positions and said non-obstructing position, second drive means for reversibly rotating said pair of second slide rings through an acute angle to move said shutter blades between one of said obstructing positions and said non-obstructing position, and control means for operating sequentially said first and second drive means in a cycle to rotate said pair of first support rings and said pair of second support rings in opposite directions thereby during each cycle to move said shutter blades between said first obstructing position and said second obstructing position through said non-obstructing position, whereby said shutter is moved from a closed position through an open position and into a closed position.

6. A shutter arrangement for use in a non-vertical position comprising a housing having an aperture formed therein, a pair of first coaxial slide rings longitudinally spaced apart from one another, a pair of second coaxial slide rings longitudinally spaced apart from one another, each first slide ring being coplanar with a second slide ring and said slide rings being mounted in said housing coaxially with the center of said aperture and for rotation about said axis, a parallel pair of closely spaced apart apertured guide plates positioned coaxially to said aperture and disposed in the longitudinal spacing between said pairs of first and second slide rings, a plurality of first pivot pins equally spaced apart about said aperture connecting said pair of first slide rings, a corresponding plurality of second pivot pins equally spaced apart about said aperture connecting said pair of second slide rings, a corresponding plurality of slotted levers, each of said slotted levers loosely pivoting about an associated first pivot pin and loosely slidably engaging an associated second pivot pin in said slot, a corresponding plurality of thin shutter blades, each of said shutter blades having a first shutter lobe and a second shutter lobe and being disposed in the spacing between said parallel guide plates and being rigidly connected at the juncture between said lobes to the pivotal portion of an associated slotted lever for movement therewith by said slide rings between a first position obstructing said aperture and a second position obstructing said aperture and through a non-obstructing position and for free transverse movement between said guide plates, said connection between said shutter blades and said slide rings including said pivot pins and said levers being such as to permit at least partial support of each of said blades by the lowermost of said guide plates and by others of said shutter blades, each of said shutter blades being disposed in said first position with said first shutter lobe obstructing said aperture and being disposed in said second obstructing position with said second shutter lobe obstructing said aperture, first drive means for reversibly rotating said pair of first slide rings through an acute angle to move said shutter blades between one of said obstructing positions and said non-obstructing position, second drive means for reversibly rotating said pair of second slide rings through an acute angle to move said shutter blades between one of said obstructing positions and said non-obstructing position, and control means for sequentially operating said first and second drive means in cycles to rotate said pair of first slide rings and said pair of second slide rings in opposite directions thereby during each cycle to move said shutter blades between said first obstructing position and said second obstructing position through said non-obstructing position, whereby said shutter is moved in a cycle from a closed position through an open position and into a closed position.

7. In a camera arrangement provided with a shutter housing having a central aperture therein, and a plurality of shutter blades mounted in said housing spaced apart about the perimeter of said aperture for movement between an open position and a closed position with regards thereto; the combination of drive means for said shutter blades comprising a reversibly rotatable drive shaft linked to said shutter blades, a helical spring engaging said shaft, means for winding said spring against said shaft in one direction to drive said shaft in said one direction and for winding said spring against said shaft in the reverse direction to drive said shaft in said reverse direction, and control means normally locking said drive shaft against rotation and being operative into a release position for permitting said wound spring to drive said shaft and move said shutter blades and for thereafter permitting said moving shutter blades to drive said shaft and partially rewind said spring thereby decelerating said shaft and said shutter blades, whereby the shock forces associated with braking of said moving blades are absorbed in said drive means.

8. In a camera arrangement provided with a shutter housing having a central aperture therein; and a plurality of shutter blades mounted in said shutter housing spaced apart about the perimeter of said aperture for movement between an open position and a closed position with regards thereto; the combination of drive means for said shutter blades comprising a reversibly rotatable drive shaft linked to said shutter blades, a helical spring engaging said shaft, means for winding said spring against said shaft in one direction to drive said shaft in said one direction and for winding said spring against said shaft in the reverse direction to drive said shaft in said reverse direction, control means normally locking said drive shaft again rotation and being operative into a release position for permitting said wound spring to drive said shaft and move said shutter blades and for thereafter permitting said moving shutter blades to drive said shaft and partially rewind said spring thereby decelerating said shaft and said shutter blades, whereby the shock forces associated with braking of said moving blades are absorbed in said drive means, and means for stopping said decelerated shaft to maintain said spring partially rewound against said shaft.

9. In a camera arrangement provided with a shutter housing having a central aperture therein, and a plurality of shutter blades mounted in said shutter housing spaced apart about the perimeter of said aperture for movement between an open position and a closed position with regards thereto; the combination of drive means for said shutter blades comprising a reversibly rotatable drive shaft linked to said shutter blades, a helical spring coaxial with and engaging said shaft, a cylinder enclosing said spring on said shaft and engaging said spring, said cylinder being rotatable in one direction for winding said spring to drive said shaft in said one direction and being rotatable in the reverse direction for winding said spring to drive said shaft in the reverse direction, control means normally locking said drive shaft against rotation and being operative into a release position for permitting said wound spring to drive said shaft and move said shutter blades and for thereafter permitting said moving shutter blades to drive said shaft and partially rewind said spring thereby decelerating said shaft and said shutter blades, whereby the shock forces associated with braking of said moving blades are absorbed in said drive means, and means for stopping said decelerated shaft to maintain said spring partially rewound against said shaft.

10. In a camera arrangement provided with a shutter housing having a central aperture therein, and a plurality of shutter blades mounted in said shutter housing spaced apart about the perimeter of said aperture for movement between an open position and a closed position with regards thereto; the combination of drive means for said shutter blades comprising a reversibly rotatable drive shaft linked to said shutter blades, a helical spring coaxial with said shaft, a cylinder enclosing said spring on said shaft, a first pair of projections respectively on said shaft and on said cylinder for engaging and winding said spring in torsion between said shaft and said cylinder responsive to one direction of rotational movement therebetween, a second pair of projections respectively on said shaft and on said cylinder for engaging and winding said spring in torsion between said shaft and said cylinder responsive to the reverse direction of rotational movement therebetween, means selectively operative for rotating said cylinder in one direction to wind said spring in torsion between one pair of said pairs of projections and for rotating said cylinder in the reverse direction to wind said spring in torsion between the other pair of said pairs of projections, control means normally locking said drive shaft against rotation and being operative into a release position for permitting said spring wound in torsion between one pair of said first and second pairs of projections to drive said shaft and move said shutter blades and for thereafter permitting said moving shutter blades to drive said shaft to partially wind said spring in torsion between the other pair of said first and second pairs of projections thereby decelerating said shaft and said shutter blades, whereby the shock forces associated with braking of said moving blades are absorbed in said drive means, and means for stopping said decelerated shaft to maintain said partially wound spring in torsion between said other pair of first and second pairs of projections.

11. In a camera arrangement provided with a shutter housing having a central aperture therein, a first slide ring and a second slide ring mounted for rotation in said housing concentric with said aperture; a plurality of shutter blades each having a first shutter lobe and a second shutter lobe and being connected to said slide rings for movement therewith between a first position obstructing said aperture and a second position obstructing said aperture through a non-obstructing position; the combination comprising a first reversibly rotatable drive for said first slide ring and a second reversibly rotatable drive for said second slide ring, locking means for said first and second drives being selectively operative for actuation of said drives, motor means for energizing said first and second drives for reverse rotation, and a control means responsive to rotation of said first and second drives for operating said motor means to energize said first and second drives for reverse rotation and for thereafter operating said locking means to actuate said first and second drives, whereby said shutter blades are operated from one to the other of said first and second obstructing positions.

12. In a camera arrangement provided with a shutter housing having a central aperture therein, a first slide ring and a second slide ring mounted for rotation in said housing concentric with said aperture; a plurality of shutter blades each having a first shutter lobe and a second shutter lobe and being connected to said slide rings for movement therewith between a first obstructing position and a second obstructing position with regards to said aperture through a non-obstructing position; the combination comprising a first drive means for said first slide ring and a second drive means for said second slide ring, each of said drive means comprising a reversibly rotatable drive shaft linked to the associated slide ring, a helical spring coaxial with and engaging said shaft, a cylinder enclosing said spring on said shaft and engaging said spring, said cylinder being rotatable in one direction for winding said spring to drive said shaft in said one direction and being rotatable in the reverse direction for winding said spring to drive said shaft in the reverse direction, and locking means normally locking said shaft against rotation and being selectively operative into a release position to permit rotation of said shaft; motor means for reversibly rotating both cylinders of said first and second drive means; and control means responsive to the rotation of said drive shafts for operating said motor means to rotate the cylinders of said first and second drive means thereby winding the springs therein and for thereafter operating the locking means to release positions thereby permitting rotation of said drive shafts; whereby said shutter blades are operated from one to the other of said first and second obstructing positions.

References Cited in the file of this patent
UNITED STATES PATENTS

| | | |
|---|---|---|
| 2,463,206 | Robertson | Mar. 1, 1949 |
| 2,472,580 | Fuerst | June 7, 1949 |
| 2,718,835 | Fuerst | Sept. 27, 1955 |